US008774355B2

(12) United States Patent
Claus et al.

(10) Patent No.: US 8,774,355 B2
(45) Date of Patent: Jul. 8, 2014

(54) METHOD AND APPARATUS FOR DIRECT RECONSTRUCTION IN TOMOSYNTHESIS IMAGING

(75) Inventors: Bernhard Erich Hermann Claus, Niskayuna, NY (US); Jeffrey Wayne Eberhard, Albany, NY (US)

(73) Assignee: General Electric Company, Niskayuna, NY (US)

( * ) Notice: Subject to any disclaimer, the term of this patent is extended or adjusted under 35 U.S.C. 154(b) by 2776 days.

(21) Appl. No.: 10/881,649

(22) Filed: Jun. 30, 2004

(65) Prior Publication Data

US 2006/0002509 A1   Jan. 5, 2006

(51) Int. Cl.
*A61B 6/03* (2006.01)

(52) U.S. Cl.
USPC ................................. 378/22; 378/21; 382/131

(58) Field of Classification Search
USPC ........... 378/21–27, 4, 210, 901; 382/131, 132
See application file for complete search history.

(56) References Cited

U.S. PATENT DOCUMENTS

| | | | | |
|---|---|---|---|---|
| 4,149,081 A * | 4/1979 | Seppi | ................................. | 378/5 |
| 4,763,345 A * | 8/1988 | Barbaric et al. | .............. | 378/146 |
| 4,903,204 A * | 2/1990 | Dobbins, III | ................. | 382/255 |
| 5,128,864 A * | 7/1992 | Waggener et al. | .............. | 378/14 |
| 5,400,255 A * | 3/1995 | Hu | ..................................... | 378/4 |
| 5,426,684 A * | 6/1995 | Gaborski et al. | ................. | 378/62 |
| 5,440,130 A * | 8/1995 | Cox et al. | .................. | 250/370.09 |
| 5,602,891 A * | 2/1997 | Pearlman | ......................... | 378/62 |
| 5,657,362 A * | 8/1997 | Giger et al. | ...................... | 378/37 |
| 5,761,257 A * | 6/1998 | Toth et al. | ........................ | 378/19 |
| 5,761,331 A * | 6/1998 | Clark, III | ....................... | 382/131 |
| 5,872,828 A * | 2/1999 | Niklason et al. | ................. | 378/23 |
| 5,881,123 A * | 3/1999 | Tam | ................................... | 378/4 |
| 6,178,220 B1 * | 1/2001 | Freundlich et al. | ............... | 378/4 |
| 6,196,715 B1 * | 3/2001 | Nambu et al. | ................. | 378/197 |
| 6,215,846 B1 * | 4/2001 | Mazess et al. | ................... | 378/62 |
| 6,263,096 B1 * | 7/2001 | Boag et al. | ..................... | 382/128 |
| 6,292,530 B1 | 9/2001 | Yavus et al. | ..................... | 378/22 |
| 6,317,478 B1 * | 11/2001 | Patch | ................................ | 378/4 |
| 6,341,156 B1 * | 1/2002 | Baetz et al. | ................. | 378/98.8 |
| 6,549,607 B1 * | 4/2003 | Webber | ............................. | 378/8 |
| 6,574,304 B1 * | 6/2003 | Hsieh et al. | ...................... | 378/62 |
| 6,674,835 B2 * | 1/2004 | Kaufhold et al. | ............... | 378/53 |
| 6,707,878 B2 * | 3/2004 | Claus et al. | ..................... | 378/22 |

(Continued)

OTHER PUBLICATIONS

Lauritsch et al., A theoretical framework for filtered backprojection in tomosynthesis, SPIE Conference on Image Processing, SPIE vol. 3338, 1998, pp. 1127-1137.*

(Continued)

*Primary Examiner* — Allen C. Ho
(74) *Attorney, Agent, or Firm* — Scott J. Asmus

(57) ABSTRACT

A technique for directly reconstructing three-dimensional images acquired in tomosynthesis imaging is provided. The method allows for pre-processing a set of projection images based upon the acquisition geometry prior to direct reconstruction of the projection images. Furthermore, the technique allows for post-processing the reconstructed image data as desired to improve image quality. If desired the direct reconstruction process may be iterated a set number of times or until a desired threshold criteria is met, such as regarding image quality.

4 Claims, 2 Drawing Sheets

(56) References Cited

U.S. PATENT DOCUMENTS

| | | | |
|---|---|---|---|
| 6,775,346 B2* | 8/2004 | Heuscher et al. | 378/4 |
| 6,904,121 B2* | 6/2005 | Claus et al. | 378/21 |
| 6,987,829 B2* | 1/2006 | Claus | 378/23 |
| 6,987,831 B2* | 1/2006 | Ning | 378/37 |
| 2003/0072409 A1* | 4/2003 | Kaufhold et al. | 378/53 |
| 2003/0095624 A1* | 5/2003 | Eberhard et al. | 378/37 |
| 2003/0161443 A1* | 8/2003 | Xiao et al. | 378/210 |
| 2003/0190010 A1* | 10/2003 | Tsujii | 378/23 |
| 2003/0194049 A1* | 10/2003 | Claus et al. | 378/22 |
| 2005/0002550 A1* | 1/2005 | Jabri et al. | 382/131 |
| 2005/0058240 A1* | 3/2005 | Claus | 378/22 |
| 2005/0111616 A1* | 5/2005 | Li et al. | 378/22 |
| 2005/0135664 A1* | 6/2005 | Kaufhold et al. | 382/131 |
| 2005/0220265 A1* | 10/2005 | Besson | 378/16 |
| 2005/0226375 A1* | 10/2005 | Eberhard et al. | 378/62 |
| 2005/0265590 A1* | 12/2005 | Li et al. | 382/131 |

OTHER PUBLICATIONS

Claus et al., A new method for 3D reconstruction in digital tomosynthesis, Medical Imaging, SPIE vol. 4684, 2002, pp. 814-824.*

Dobbins III et al., Digital x-ray tomosynthesis: current state of the art and clinical potential, Phys. Med Biol., 48, 2003, pp. R65-R106.*

Sone et al., Development of a High-Resolution Digital Tomosynthesis System and Its Clinical Application, RadioGraphics, 1991, pp. 807-822.*

Matsuo et al., Three-Dimensional Image Reconstruction by Digital Tomo-Synthesis Using Inverse Filtering, IEEE Transactions on Medical Imaging, vol. 12, No. 2, Jun. 1993, pp. 307-313.*

Grant, Tomosynthesis: A Three-Dimensional Radiographic Imaging Technique, IEEE Transactions on Biomedical Engineering, vol. BME-19, No. 1, Jan. 1972, pp. 20-28.*

Niklason et al., Digital Tomosynthesis in Breast Imaging, Radiology, 1997; 205, pp. 399-406.*

* cited by examiner

METHOD AND APPARATUS FOR DIRECT RECONSTRUCTION IN TOMOSYNTHESIS IMAGING

BACKGROUND

The present invention generally relates to the field of image reconstruction in X-ray tomosynthesis systems, and more particularly to the direct reconstruction of tomosynthesis images.

In three-dimensional (3D) X-ray imaging techniques, such as X-ray tomosynthesis, projection images are acquired for varying positions of one or more X-ray sources relative to the imaged object. For example, in X-ray tomosynthesis, X-rays are generated by the one or more X-ray sources, and are generally collimated prior to passing through the object being scanned. The attenuated X-rays are then detected by a set of detector elements. Each detector element produces a signal based on the intensity of the attenuated X-rays, and the resulting signals are processed to produce the projection images. From these projection images, a three-dimensional volumetric image of the imaged object is reconstructed. Typically, the reconstructed volumetric image is arranged in slices that are generally parallel to the detector plane.

In tomosynthesis imaging, it is typical to acquire the projection radiographs, i.e., images, from only a few angles within a relatively narrow angular range of the X-ray source relative to the imaged object. Despite the narrow range from which projection images are acquired, it is still generally possible to reconstruct a three dimensional representation of all or part of the imaged volume. In general, some of the challenges that need to be addressed by any tomosynthesis reconstruction technique are efficient separation of overlying tissue, enhancement of contrast, particularly of small structures, and artifact minimization. However, due to the limited or incomplete data acquired in tomosynthesis, a perfect reconstruction in the mathematical sense is not possible. As a result, the volumetric images reconstructed from a tomosynthesis acquisition may exhibit artifacts, for example due to high-contrast structures in the imaged volume.

Direct reconstruction techniques used in tomosynthesis, such as reconstruction via shift-and-add algorithms or simple backprojection, are generally fast and computationally efficient, since they allow reconstruction of a three-dimensional image data set in a single reconstruction step. They also allow for reconstruction of only small sub volumes of the imaged volume. Unfortunately, most direct reconstruction methods exhibit relatively poor image quality with a low contrast and a significant artifact level. Other reconstruction techniques, such as algebraic reconstruction techniques (ART) improve image quality through an iterative step. In particular, these types of iterative reconstruction techniques typically perform an initial reconstruction followed by iterative updates of the three-dimensional image data set until some threshold criteria is met.

However, iterative reconstruction techniques may be computationally expensive since they generally involve reconstructing a three-dimensional image of the full imaged volume, and not just a subvolume. In addition, they generally iteratively update the full three-dimensional image, typically with at least five to ten iterations or more, so that substantial computational effort may be required.

BRIEF DESCRIPTION OF THE INVENTION

Embodiments of the present invention address these issues, as well as others. In one embodiment of the present technique, a method for generating a three-dimensional image data set is provided. The method comprises pre-processing a set of projection images based upon an acquisition geometry associated with the acquisition of the set of projection images. The method further comprises directly reconstructing the set of pre-processed projection images to generate the three-dimensional image data set.

In another embodiment of the present technique, an imaging system is provided. The system comprises an X-ray source configured to emit X-rays through a volume of interest from different locations relative to the imaged object and a detector configured to generate a set of projection images from the signals. The system further comprises signal processing circuitry configured to generate a set of projection images from the signals. In addition, the system further comprises reconstruction circuitry configured to directly reconstruct the set projection images to generate a three-dimensional image data set.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

The present technique provides improved image quality in images generated using direct reconstruction. As described above, direct reconstruction techniques do not generally require a reconstruction of the full three-dimensional image data set and may thus be computationally efficient. In addition, direct reconstruction techniques are generally not iterative in nature. In general, the present techniques may be utilized in a variety of imaging contexts, including medical imaging, non-destructive evaluation of industrial parts, and baggage and package screening. To the extent that the following passages discuss a particular embodiment or implementation, such as medical imaging, it should be kept in mind that such an embodiment or implementation in merely exemplary, and is not intended to limit the applicability of the present techniques or to otherwise restrict their general applicability to other imaging contexts.

Figure 1:
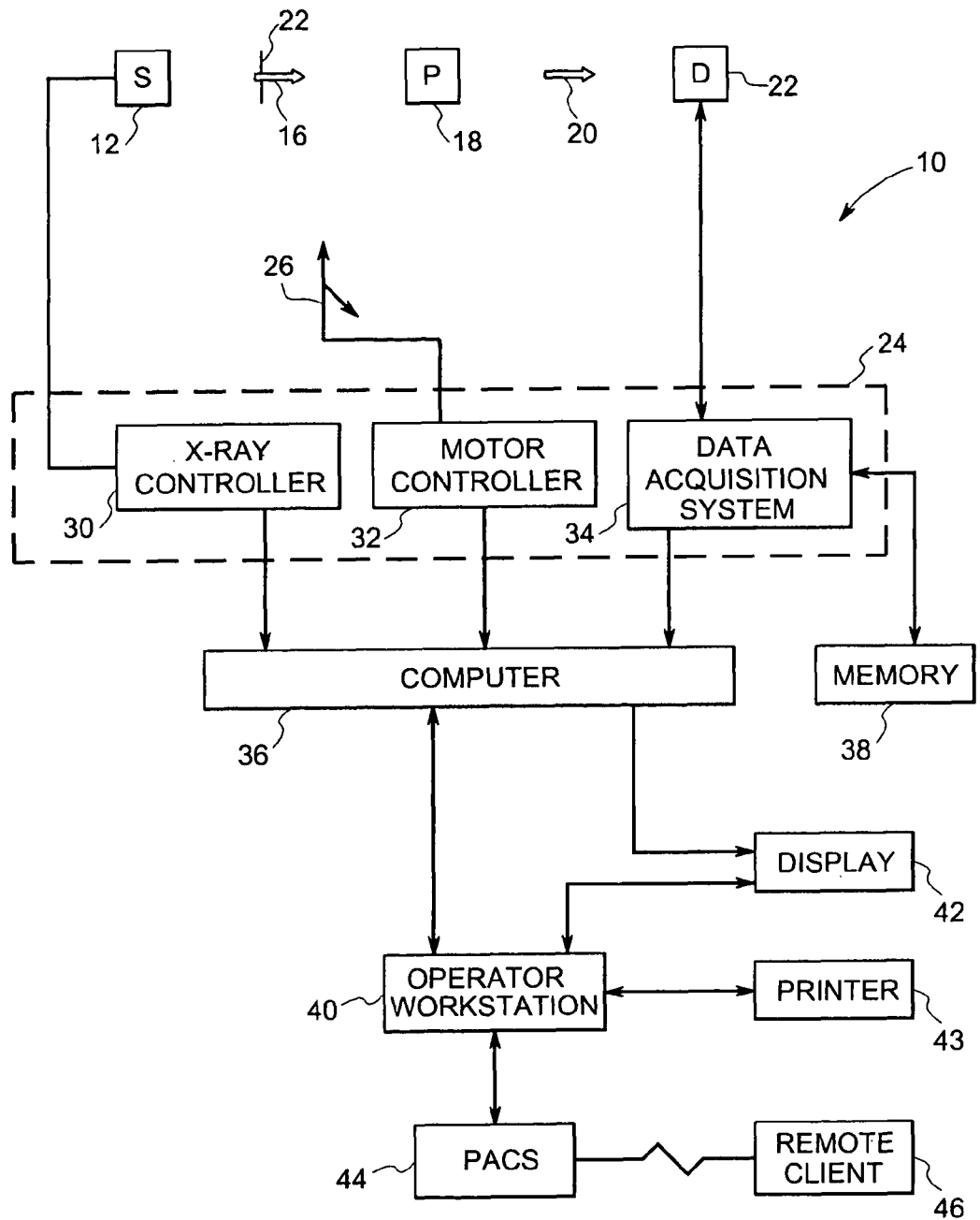
FIG. 1 is a diagrammatical view of an exemplary imaging system in the form of a tomosynthesis system for scanning an object in accordance with aspects of the present technique.

Turning now to the figures, FIG. 1 depicts an imaging system 10 which may be used to acquire, process, and/or reconstruct projection images in accordance with the present techniques. The system 10 is depicted as an exemplary tomosynthesis system, though, as will be appreciated by those of ordinary skill in the art, the present techniques may be applicable to other imaging modalities. The imaging system 10 includes a source 12 of radiation, such as an X-ray tube. The source 12 may be configured to move freely or along one or more configured trajectories relative to the imaged object. The source 12 may include associated support and filtering components. While the source 12 may, in certain implementations, include a single emitter of radiation, such as the movable X-ray tube described, in other implementations the source 12 may actually include multiple emitters of radiation. For example, the source 12 may be two or more X-ray tubes or solid-state X-ray emitters configured such that radiation is emitted from only one location at a time. In configurations in which the source 12 includes multiple emitters, the emitters may be fixed, so that each emitter emits radiation from only one location, or may be movable, so that one or more of the emitters may emit radiation from multiple locations. Regardless of the implementation, the source 12 is capable of emitting radiation from different positions relative to the object being imaged during the course of an imaging session. In the case where the source 12 comprises movable elements, the X-ray source may be stationary or moving during an exposure.

A stream of radiation 16, typically X-rays, is emitted by the source 12. A portion of the radiation 20 passes through or around the object being imaged, such as a patient, and impacts a detector array, represented generally at reference numeral 22. Detector elements of the array 22 produce electrical signals that represent the intensity of the incident X-rays. These signals are acquired and processed to form a projection image, which is then used to reconstruct volumetric images of the features within the object. A collimator 23 may define the size and shape of the stream of radiation 16 that emerges from the source 12.

Source 12 is typically controlled by a system controller 24 which furnishes both power and control signals for tomosynthesis examination sequences, including positioning of the source 12 relative to the object 18 and the detector 22. Moreover, detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 may also include signal processing circuitry, typically based upon a general purpose or application-specific digital computer, associated memory circuitry 38 for storing programs and routines executed by the computer 36, as well as configuration parameters and image data, interface circuits, and so forth. In accordance with one embodiment of the present technique, the signal processing circuitry in the system controller 24 may be configured to generate a set of projection images from the signals generated by the detector 22. As will be appreciated by those of ordinary skill in the art, the system controller 24 and its individual components may be part of the general purpose or application specific computer 36 or may merely communicate with the computer 36.

In the embodiment illustrated in FIG. 1, system controller 24 is coupled to a positional subsystem 26 which positions the X-ray source 12 relative to the object 18 and the detector 22. In alternative embodiments, the positional subsystem 26 may move the detector 22 or even the object 18 instead of the source 12 or together with the source 12. In yet another embodiment, more than one component may be movable, controlled by the positional subsystem 26. Thus, radiographic projections may be obtained at various angles through the object 18 by changing the relative positions of the source 12, the object 18, and the detector 22 via the positional subsystem 26. A motor controller 32 included as part of the system controller 24 may be utilized to control the movement of the positional subsystem 26. As noted above, certain systems may employ distributed sources or radiation, i.e., multiple emitters, and such systems may not require such displacement of the source 12. Similarly, in some embodiments, more than one detector may be used. In other embodiments, detectors other than area detectors may be used (e.g., line detectors), and the projection images are formed by reading out these detectors for several varying detector positions.

Additionally, as will be appreciated by those skilled in the art, the source 12 of radiation may be controlled by an X-ray controller 30 included as part of the system controller 24. Particularly, the X-ray controller 30 may be configured to provide power and timing signals to the source 12. In this manner, the X-ray controller 30 may control the timing and characteristics of the radiation emissions from the source 12 while the motor controller 32 controls the position of the source 12, if applicable.

Further, the system controller 24 is also illustrated including a data acquisition system 34. The detector 22 is typically coupled to the system controller 24, and more particularly to the data acquisition system 34. The data acquisition system 34 typically receives data collected by readout electronics of the detector 22. For example, the data acquisition system 34 may receive sampled analog signals from the detector 22 and convert the data to digital signals for subsequent processing by the computer 36.

The data collected by the data acquisition system 34 may be transmitted to processing circuitry of the computer 36 or to associated memory circuitry 38. It should be understood that any type of memory adapted to store a large amount of data may be utilized by such an exemplary system 10. Also the computer 36 may be configured to receive commands and scanning parameters from an operator via an operator workstation 40, typically equipped with a keyboard and other input devices. In accordance with one or more aspects of the present technique, the computer 36 may include pre-processing circuitry configured to pre-process the projection images based upon the geometry of the source 12, the detector 22, and the volume of interest during the acquisition of signals. In particular, the pre-processing may be based on the relative position of the source 12, the detector 22, and the volume of interest (or the imaged object) during each exposure, as well as the collection of the respective positions for the full acquisition. Furthermore, the pre-processing may also be based on the shape and orientation of the object as well as the detector. We refer to all these different factors collectively as, the "acquisition geometry" of the acquisition. In addition, the computer 36 may also include reconstruction circuitry configured to directly reconstruct the set of pre-processed projection images to generate a three-dimensional image data set. Further, the computer 36 may also include post-processing circuitry configured to post-process the three-dimensional image data set based upon the geometry of the source 12, the detector 22, and the volume of interest during signal acquisition. Reconstructed volumetric images may be transmitted to the display 42 for review and/or to the memory 38 for storage.

As noted above, an operator may control the system 10 via input devices. The operator may, thereby, initiate imaging, observe the reconstructed volumetric image and other data relevant to the imaging system 10, and so forth. All of these functions may be carried out by a single computer or they may be distributed across several computers, such as application specific workstations, i.e., reconstruction workstations, review workstations, operator workstations 40, and so forth.

Furthermore, a display 42 coupled to the operator workstation 40 may be utilized to observe the acquired projection images, the reconstructed volumetric image, or a suitably processed version thereof, and to facilitate control of the imaging system 10. Additionally, the reconstructed image may be printed on a printer 43 which may be coupled to the computer 36 and/or to the operator workstation 40. Further, the operator workstation 40 may also be coupled to a picture archiving and communications system (PACS) 44 for storing the reconstructed projection images or the acquired projection images. It should be noted that PACS 44 may be coupled to a remote client 46, radiology department information system (RIS), hospital information system (HIS) or to an internal or external network, so that others at different locations may gain access to the image data and other related information.

It should be further noted that the computer 36 and the operator workstation 40 may be coupled to other output devices, which may include standard or special purpose computer monitors. One or more of the operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

The system of FIG. 1 may be used in accordance with the direct reconstruction techniques described herein. In particular, referring now to FIG. 2, a flowchart is provided that describes exemplary steps of a direct reconstruction process, in accordance with one or more aspects of the present technique. For example, in step 52, a set of projection images are acquired, such as by the system controller 24 of the imaging system 10, as described in FIG. 1. In step 54, the acquired projection images are pre-processed, such as by pre-processing circuitry in the computer 36. As will be appreciated by those of ordinary skill in the art, the pre-processing step 54 is optional, but may be performed to facilitate subsequent processing or improve final image quality. For example, the pre-processing step 54 may be based upon the geometry of the source 12, the imaged object, and the detector 22 during the acquisition process, i.e. the acquisition geometry, to address artifacts or image effects related to the acquisition geometry. These pre-processing steps may address image effects within the projection images themselves, or effects which will affect the reconstructed three-dimensional volume, and which are related to the acquisition geometry. As will be appreciated by those of ordinary skill in the art, geometry parameters that are known a priori, or that are determined from the system controller 24, the image readout, and/or a suitable calibration or measurement process may provide information regarding the acquisition geometry, which may be used in the pre-processing step 54. In addition, other pre-processing steps, discussed in greater detail below, may be encompassed in the overall step 54 of pre-processing.

The pre-processed projection images (or un-processed projection images if no pre-processing step 54 is performed) may be reconstructed at step 56 to directly generate a three-dimensional image data set. In accordance with one embodiment of the present technique, reconstructing the set of projection images comprises backprojecting the pre-processed projection images and combining the backprojected projection images to directly generate a three-dimensional image data set. Various geometries may be employed for backprojecting the set of pre-processed projection images, such as for example, cone-beam geometry, parallel beam geometry, combined parallel beam geometry and fan-beam geometry. In addition, in accordance with the present technique, back-projecting the set of pre-processed projection images may be performed in image space or in Fourier space. Also, a number of techniques may be employed in accordance with the present technique to combine the backprojected images, such as summation, averaging, weighted averaging, order-statistics based operations or weighted order-statistics based operations. Furthermore, one or more constraints may be applied to the pre-processed projection images or to the combined set of backprojected projection images. For example, the backprojected images may be combined using the result of a skin line detection step (that typically includes "background" detection) to set the reconstruction to zero, when one or more backprojected images indicate "background" for that location. In one embodiment, this skin line detection step is performed as part of the pre-processing step 54.

At step 58, the reconstructed three-dimensional image data may be post processed, if desired, such as by the post-processing circuitry in the computer 36. In accordance with one embodiment of the present technique, post-processing the three-dimensional image data may be based upon the acquisition geometry used to acquire the set of projection images. As will be appreciated by those of ordinary skill in the art, some processing routines may be performed either as part of the pre-processing step 54 or as part of the post-processing step 58, or there may be processing routines that have essentially equivalent effects if performed either during pre- or post-processing. With this in mind, some post-processing routines may be particularly useful if the corresponding equivalent processing was not performed in a pre-processing step 54.

The post-processing step 58 may allow the application of one or more constraints, such as to apply thresholds at the maximum and minimum physically admissible value. Alternatively, the values within the reconstructed volume may be rounded off to assume a discrete set of predetermined values. Furthermore, values corresponding to locations outside the boundary of the imaged object may be set to zero. In addition, the post-processing step 58 may include routines for deblurring, managing artifacts, and/or performing geometric transformations of the three-dimensional image data set. For example, in implementations where it is desirable to measure the size of structures within the reconstructed volume or distances between structures, it may be desirable to resample and/or interpolate the reconstructed three-dimensional data set onto a different coordinate or voxel grid. Such re-sampling and/or interpolation may be particularly beneficial where a parallel beam backprojection was utilized for reconstruction since the parallel beam backprojection implicitly creates a varying voxel size. Furthermore, one or more image enhancement routines may be performed on the reconstructed image data at the post-processing step 58 to generate a cleaner or more desirable three-dimensional data set. Such image enhancement routines may include high pass filtering or dynamic range management of the reconstructed image data. In step 60, the full three-dimensional dataset, or a selected subvolume of the three-dimensional data set may be displayed and visualized on the operator workstation 40 of the imaging system 10 or on other suitable display platforms.

Figure 2:
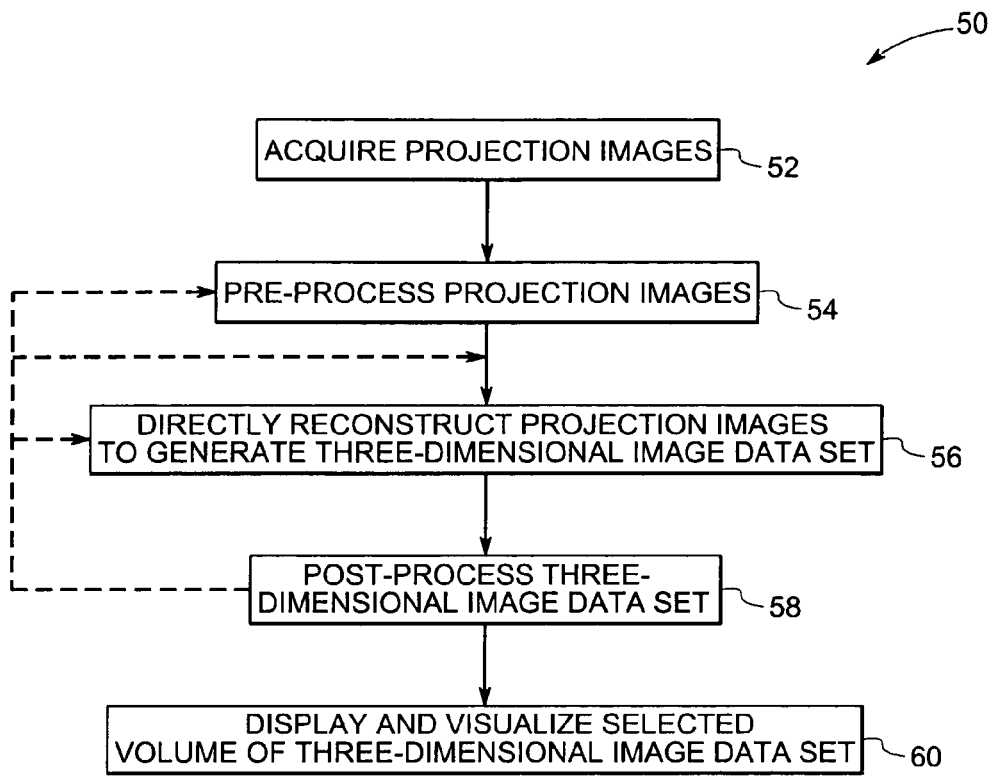
FIG. 2 is a flowchart describing exemplary steps for direct reconstruction of tomosynthesis image data, in accordance with aspects of the present technique.

As depicted in FIG. 2, the direct reconstruction step 56 may also be repeated, i.e., iterated, to further improve image quality. For example, in cases that include a non-linear processing step in the reconstruction process, an iterative update step may be employed to improve the image quality of the reconstruction. In accordance with one embodiment of the present technique, the iterative update step includes reprojection of the three-dimensional dataset for a projection geometry that corresponds to the acquisition geometry for one of the originally acquired projection images, and then taking the difference to the true projection image at that geometry or projection angle. In this embodiment, the iterative update includes performing a backprojection of the difference and updating the three-dimensional data set. The update may be any one of an additive update, a multiplicative update, or an update based on a probabilistic rule, or any other suitable update. In addition, the iterative update may be performed with one or more projection images at a time, or with one or more sub regions of at least one projection image.

Further, in accordance with one embodiment of the present technique, the reconstruction step 56 may be performed a specific number of times or until some threshold condition is fulfilled, such as satisfying the reprojection constraint. As is shown in FIG. 2, some or all aspects of the post-processing step 58 may be performed either as part of each iteration or subsequent to the iterative improvement process. That is, the iteration may be performed before one or more of the post-processing steps are applied, and the post-processing may be carried out only on the resulting three-dimensional data set. This may be useful, for example, in reconstructions that employ transverse filtering. As will be appreciated by those skilled in the art, while transverse filtering improves the perceived image quality in general, it may be not be beneficial to the re-projection consistency of the reconstructed three-dimensional data set in some instances and may interfere with the convergence of the iterative update. Similarly, some or all of the routines performed in a suitable preprocessing step may be part of each iteration or may simply precede the iterative improvement process.

Figure 3:
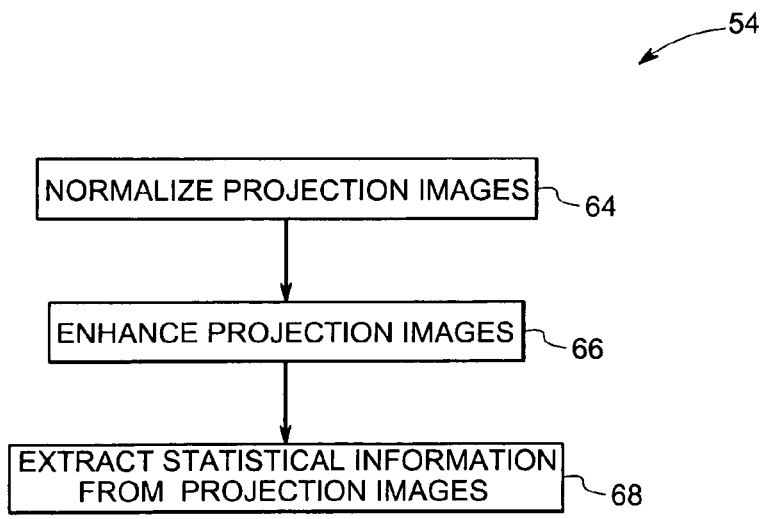
FIG. 3 is a flowchart describing in greater detail aspects of the process of FIG. 2.

Referring now to FIG. 3, a flowchart is provided describing, in somewhat greater detail, exemplary steps for pre-processing the image data in accordance with aspects of the present technique. It should be kept in mind that the steps for pre-processing image data in accordance with the present technique may occur in different orders than that depicted. Alternatively, one or more of the pre-processing steps may be performed substantially concurrently, i.e., in parallel, or they may be combined into a single step. Furthermore, one of ordinary skill in the art will appreciate that, while the present discussion describes exemplary steps, which may be performed in a pre-processing step 54, not all of these steps are necessarily performed in a given application.

One step, which may occur in pre-processing, is normalization of the projection images, depicted at step 64. Image normalization typically involves converting the image values in the set of acquired projection images to line-integrals of X-ray attenuation values. In one embodiment, the image values are converted to average attenuation values along the X-ray path. To perform this conversion, the compressed breast thickness may be employed. In this embodiment, the compressed breast thickness may be derived from the compression paddle readout, a suitable compression paddle height calibration or measurement, and so forth. In one embodiment of the present technique, image normalization may also include correcting physical effects in the projection images. For example, the effect of X-ray technique (e.g., keV and mAs), X-ray dose, scatter, beam hardening, heel-effect or other anisotropies in X-ray flux generated by the X-ray tube, and detector specific effects such as offset, gain and defective pixels may constitute physical effects that may be corrected during the image normalization step 64.

In addition, image normalization may include performing one or more geometric operations or transformations, such as warping and/or shifting of the set of projection images. In particular, geometric operations may be performed for system configurations employing non-stationary detectors. However, other system configurations may also benefit from performing geometric operations or transformations. For example, geometric operations may be applied when the shape or configuration of the detector is not suitable for the desired reconstruction technique. For instance, it may be desirable to perform a mapping from a planar geometry to a curved detector geometry in some circumstances. Note that the geometric operations that are applied may also have an effect on the specific characteristics of other pre-processing routines, such as image normalization routines.

The projection images may also be enhanced, as depicted at step 66. Image enhancement may include performing interpolation of missing views, such as where the interpolation is based on a previous reconstruction or is performed directly from other projection images. Image enhancement may also include performing filtering or dynamic range management (DRM) of the projection image data. Furthermore, filtering may be performed based on the acquisition geometry, such as may be determined from the system controller 24, the positioner readout, a suitable scanner geometry calibration or measurement, or other methods. In one embodiment, the projection images are filtered essentially transverse to an imaging trajectory associated with the acquisition of the set of projection images to improve image quality. The filtering may be performed using a two-dimensional filter or a one-dimensional filter or using a combination of filters. In addition, the filtering may be performed using standard linear shift invariant filters or other suitable filters. These filters may also comprise morphological filters, or multi scale filters, such as scale enhancement using wavelets. Filtering may also be implemented in the Fourier domain. Filtering may also be performed essentially parallel to an imaging trajectory associated with the acquisition of the set of projection images. Generally, different filtering steps may be combined into one filtering step, or may be performed separately.

In one embodiment of the present technique, the image enhancement step 66 includes recombining projection image data, such as two or more projection images, in the Fourier or image domain to generate one or more recombined projection images. For example, recombining the set of projection images may involve deriving recombined projection images by a linear combination of suitably filtered and shifted (or otherwise geometrically mapped) projection images. The recombined projection images may then be processed and/or reconstructed as a conventional projection image to generate a three-dimensional image data set.

In one embodiment of the present technique, the pre-processing step 54 may include performing anatomy or object specific corrections or detecting and correcting anatomical features of the imaged anatomy. Examples for anatomy specific processing techniques include skin line detection and thickness compensation or detection of compressed regions in mammography. This processing may be combined with suitable image enhancement steps, where for example the background is "filled in" with an image value corresponding to a material of average attenuation. In this manner, the contrast between background and imaged tissue may be minimized, which in turn may reduce artifacts associated with the skinline when a suitable filtering step is applied. In another embodiment, findings-based filtration may be used to enhance specific findings or structures of interest in the projection images. Similarly, other structures contained in the images, or their impact on the reconstructed image quality can either be enhanced or suppressed. For example, in mammography, a conversion into a tissue specific representation may be performed as part of the pre-processing, such as the conversion into hint, the percentage or absolute value of "interesting tissue" (e.g., fibro glandular) along each ray path. For this conversion, additional information may be required, such as a prior calibration of the imaging system with a phantom containing different material compositions at different thicknesses.

The pre-processing step 54 may also include the extraction of statistical or other information from the set of projection images, as depicted at step 68. The statistical information may include measures of local mean, variance, or standard deviation, or descriptors or features associated with the local image texture. The statistical measures may be used in other processing steps, such as for the determination of confidence values. Other information that may be extracted includes edge detection, detection of curvilinear structures, etc. The extracted statistical or other information may in turn determine weights in a weighted combination of the backprojected projection images, or for the detection and/or segmentation of regions or features of interest, such as calcifications.

While the preceding discussion describes various aspects of the present technique, the following paragraphs describe specific examples and/or embodiments of direct reconstruction techniques that may benefit from one or more of the processes or steps described above.

For example, the direct reconstruction step 56 of FIG. 2 may employ a CT reconstruction algorithm known in the art such as, for example, filtered backprojection techniques, algebraic reconstruction techniques etc. As will be appreciated by those skilled in the art, filtered backprojection reconstruction techniques filter projection images in a direction substantially parallel to the scan path of the X-ray source 12. Filtering projection images parallel to the scan path may result in the creation of non-isotropic appearance of the final reconstructed images caused by variations in contrast that depend on the shape and orientation of the imaged structures relative to the imaging geometry. For example, a narrow and elongated structure may undergo a significant enhancement in contrast if it is oriented essentially perpendicular to the scanning direction and that same structure will undergo almost no contrast enhancement if it is oriented parallel to the scan path. Therefore, in order to improve perceived image quality, a transverse filtering step may be performed at the pre-processing step 54 or the post-processing step 58. In addition, further modifying the CT reconstruction technique to comprise a suitable artifact management technique, such as using an order statistics based backprojection (OSBP) or a weighted backprojection, in the CT reconstruction algorithm may further improve image quality of the reconstructed three-dimensional image data set.

In another embodiment of the present technique, the direct reconstruction step 56 may utilize a direct algebraic reconstruction technique (DART), as discussed in U.S. Pat. No. 6,987,829, hereby incorporated by reference. DART comprises filtering and combining the projection images followed by a simple backprojection to generate a three-dimensional reconstructed data set. In this embodiment, one or more geometric operations may be performed, such as at the pre-processing step 54, depending on the specific acquisition geometry. Similarly, as described above, the DART technique may be combined with an ordered statistics backprojection (OSBP) or weighted backprojection approach, such as for artifact management. In addition, transverse filtering of the projection images may be performed at the pre-processing step 54 or the post-processing step 58 to improve isotropic image quality.

In yet another embodiment of the present technique, direct reconstruction at step 56 may be performed in conjunction with Fourier based reconstruction techniques, as discussed in U.S. Pat. No. 6,904,121, hereby incorporated by reference. Fourier based reconstructions essentially combine a solution of projection equations in Fourier space followed by a simple parallel-beam backprojection in Fourier space. An embodiment employing Fourier based reconstruction may also benefit from other aspects of the technique described herein, such as the use of simple cone-beam backprojection, order statistics based cone-beam backprojection (OSBP), or weighted cone-beam backprojection for artifact management and avoidance of a geometric re-mapping in the post-processing followed by a transverse filtering step for improved image quality. Alternatively, the transverse filtering may be applied prior to the backprojection in Fourier space.

As will be appreciated by those of ordinary skill in the art, the techniques for direct reconstruction described herein, have several advantages over other reconstruction approaches. In particular, the direct reconstruction techniques described are generally more computationally efficient and quicker than comparable iterative reconstruction approaches, since only a single backprojection per projection angle may be performed and a reconstruction of the full imaged volume is not performed. In addition, the direct reconstruction techniques described herein may reduce storage and memory requirements because the full reconstructed data set does not need to be stored at any one point in time. The direct reconstruction techniques may also provide advantages in image quality, such as by minimizing artifacts, or providing a more isotropic image appearance, when compared to other reconstruction algorithms known in the art.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An imaging system, comprising:
    at least one X-ray source configured to emit X-rays through a volume of interest at different points;
    a detector configured to produce signals in response to an impact of the X-rays on the detector;
    signal processing circuitry configured to generate a set of projection images from the signals;
    processing circuitry configured to process at least one of the signals and the set of projection images based upon an acquisition geometry; and
    reconstruction circuitry configured to directly reconstruct the set of projection images to generate a three-dimensional image data set.

2. The imaging system of claim 1, wherein the processing circuitry is configured to pre-process each projection image based upon a geometry of the at least one X-ray source, the detector, and the volume of interest during the acquisition of the signals used to generate the respective projection image.

3. The imaging system of claim 2, wherein the processing circuitry is further configured to pre-process each projection image by at least filtering each projection image transverse to an imaging trajectory comprising the trajectory of X-ray emissions from the at least one X-ray source relative to at least one of the volume of interest and the detector during acquisition of the signals used to generate the respective projection image.

4. The imaging system of claim 1, wherein the processing circuitry is further configured to post-process the three-dimensional image data set based upon at least the geometry of the at least one X-ray source, the detector, and the volume of interest during signal acquisition.

\* \* \* \* \*